United States Patent [19]
Schwarz

[11] 3,989,280
[45] Nov. 2, 1976

[54] PIPE JOINT

[76] Inventor: Ing. Walter Schwarz, Engerthstrasse 237 B, Vienna 2, Austria

[22] Filed: Sept. 10, 1973

[21] Appl. No.: 395,942

[30] Foreign Application Priority Data
Sept. 18, 1972 Austria .............................. 7996/72
Apr. 25, 1973 Austria .............................. 3693/73

[52] U.S. Cl. .................................. 285/21; 285/239
[51] Int. Cl.² ........................................... F16L 13/02
[58] Field of Search ............ 285/21, 284, 292, 149, 285/293, 417, 369, 55, 239, DIG. 22; 38/109, 125

[56] References Cited
UNITED STATES PATENTS

| | | | |
|---|---|---|---|
| 2,094,692 | 10/1937 | Hitz | 285/21 X |
| 2,264,815 | 12/1941 | Thomson | 285/239 |
| 2,805,088 | 9/1957 | Cline et al. | 285/239 |
| 3,210,100 | 10/1965 | Lowles et al. | 285/239 |
| 3,370,870 | 2/1968 | Mahoff | 285/369 X |
| 3,423,109 | 1/1969 | New et al. | 285/149 |
| 3,468,563 | 9/1969 | Duret | 285/369 X |
| 3,508,766 | 4/1970 | Kessler et al. | 285/21 |
| 3,524,661 | 8/1970 | Farnam | 285/239 |
| 3,561,795 | 2/1971 | Becher | 285/292 X |
| 3,677,581 | 7/1972 | Breitfuss | 285/292 |
| 3,711,130 | 1/1973 | Betzler | 285/239 |
| 3,744,823 | 7/1973 | Muir et al. | 285/21 |
| 3,765,979 | 10/1973 | Thomas | 285/21 X |
| 3,768,841 | 10/1973 | Byrne et al. | 285/21 |
| 3,784,235 | 1/1974 | Kessler et al. | 282/21 |

*Primary Examiner*—G. V. Larkin
*Attorney, Agent, or Firm*—Kinzer, Plyer, Dorn & McEachran

[57] ABSTRACT

A pipe joint between a pipe of reinforced plastic and a second pipe, which may be metal or plastic, and which may have a peripheral shoulder with the plastic material of the first pipe overlapping and interlocking with the shoulder.

1 Claim, 9 Drawing Figures

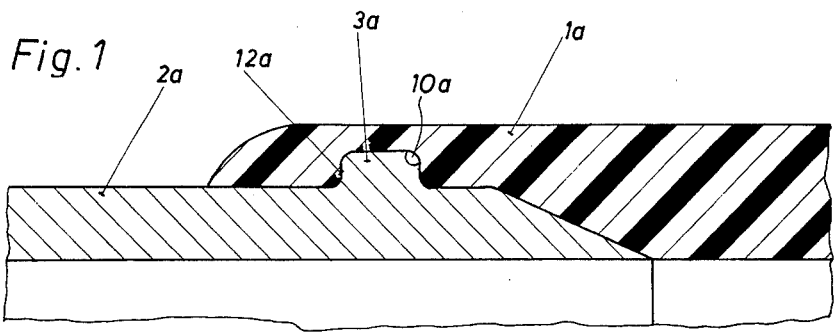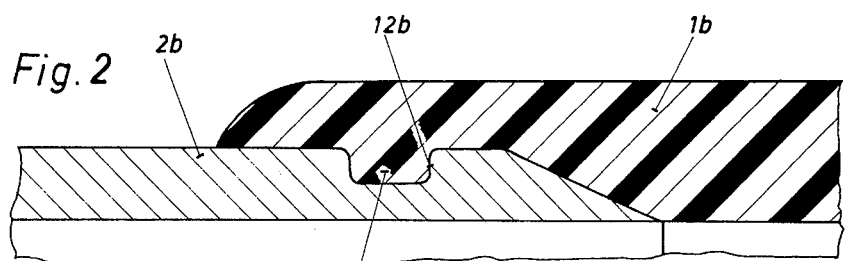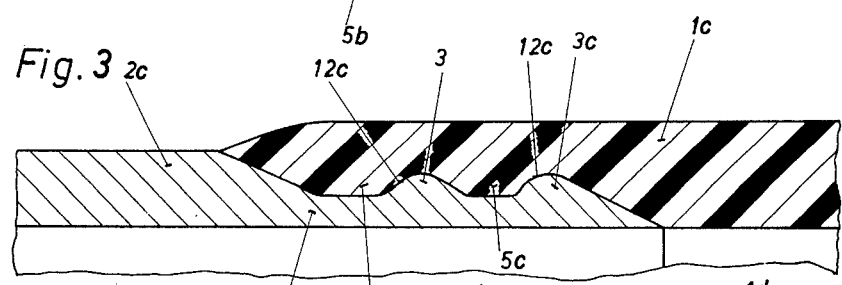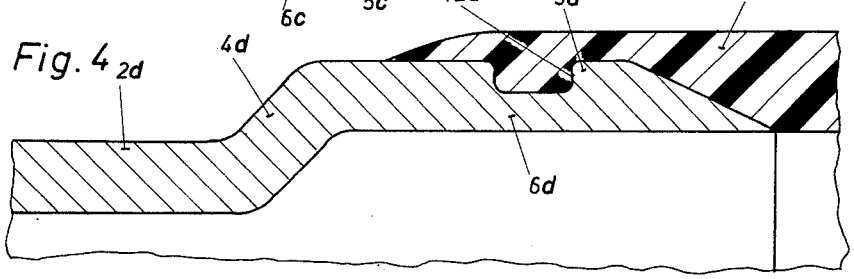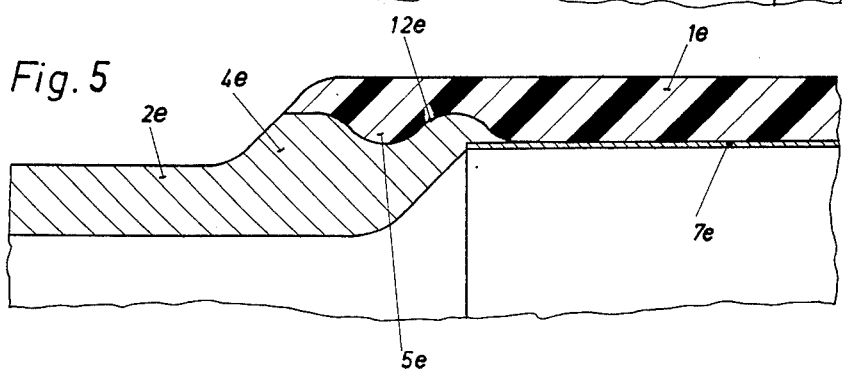

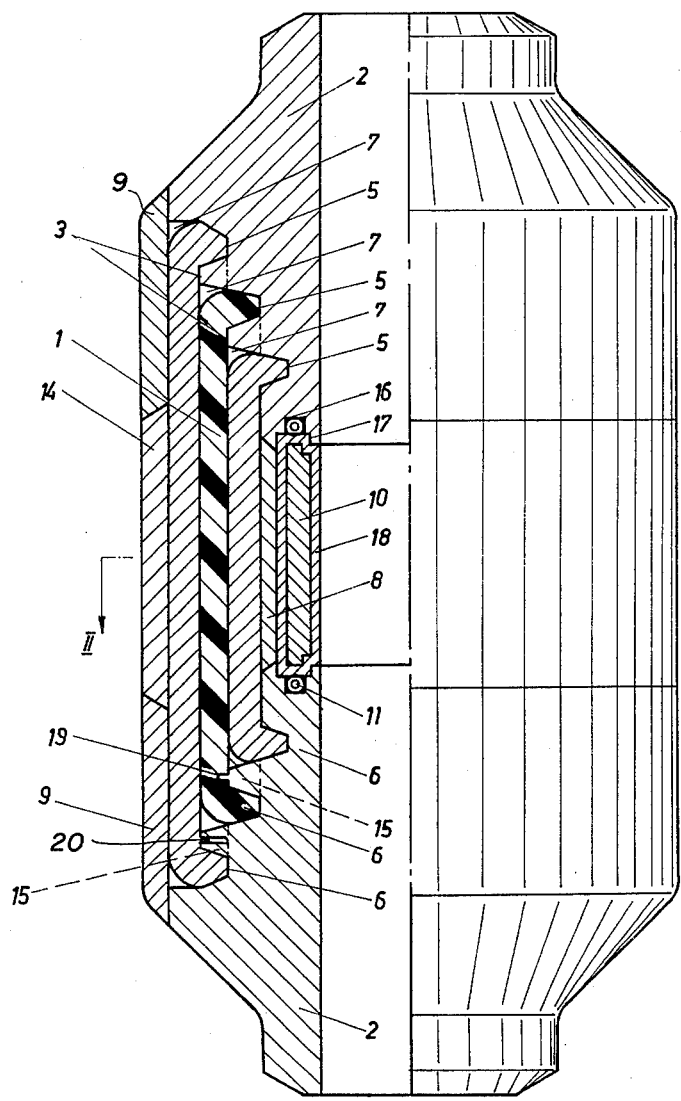
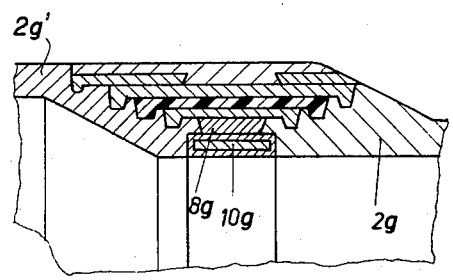
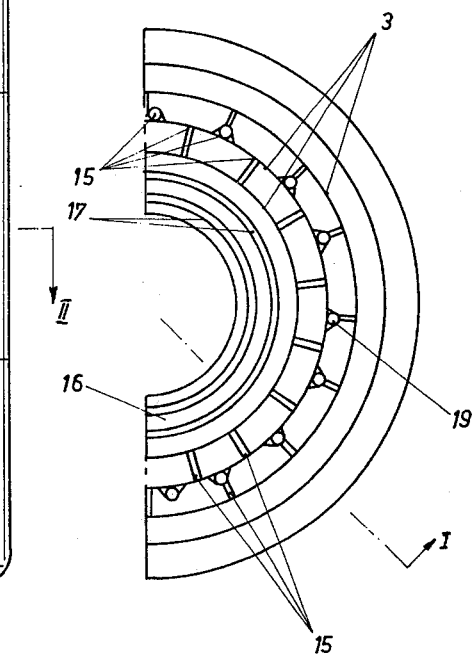
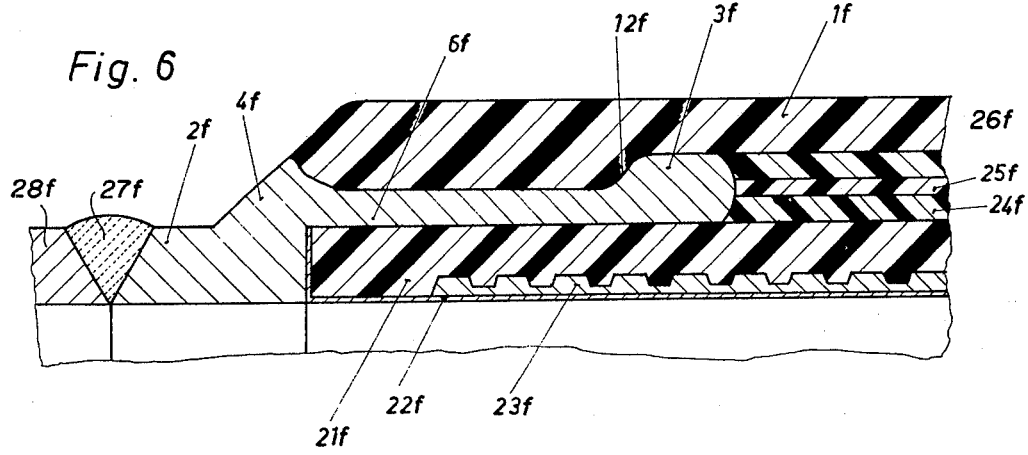

PIPE JOINT

SUMMARY OF THE INVENTION

This invention relates to a pipe joint between a pipe of reinforced plastic material and a second pipe, which may consist of any of various materials.

To achieve this improvement, reinforcing materials and/or fillers are added to the plastic material. These admixtures consist, as a rule, of pulverized materials, staple fibers or continuous filaments, rovings, mats, nonwoven and woven fabrics which, in comparison to the plastic material to be reinforced, have, e.g., a modulus of elasticity which is several times higher, a higher tensile strength and compressive strength, a high bonding capacity, and are inert to the plastic material and all chemical components contained therein. Such reinforcing materials consist preferably of glass fibers, ceramic fibers, asbestos fibers, synthetic fibers, sisal, metal wire, single-crystal fibers, and carbon fibers. Among the synthetic fibers, polyamide and polyester fibers are particularly valuable. These are embedded in the plastic material as a reinforcement in the form of rovings, staple fibers and woven fabrics.

The plastic materials consist of resin-hardened combinations based on polyester resins, epoxy resins, phenolic resins, melamine resins, silicone resins, hydrocarbon resins, vinyl ester resins, acrylate resins or the like, which may be modified by certain functional groups and be provided with chemical admixtures and fillers to improve specific properties.

Pipes of reinforced plastic materials are known and are used in numerous fields. Owing to their good mechanical and chemical properties they have often replaced pipes of other materials, such as steel and iron, ceramics, concrete and glass, particularly when it had become possible to make plastic material pipes which are large or very large in diameter and have relatively uniformly good properties.

Particularly in conjunction with pipes of a very large diameter, about 1–2 meters and more, it has always been difficult and expensive to provide tight pipe joints, especially if the latter had to be pressure-resisting too.

In most cases there has been a lack of a technically and economically useful solution for the connection of pipes made of different materials and having a large nominal width.

A primary object of the invention is to connect large diameter pipes by a joint which is tight and pressure-resisting although the solution according to the invention can also be used with pipes having a small nominal width.

Another object underlying the invention is to provide a joint between pipes which consists of different materials, such as steel and plastic material, or different plastic materials, which have no or only low affinity to each other.

An additional object underlying the invention is to provide a pipe joint which is gastight, liquidtight and pressure-resisting without a need for additional mechanical components, such as flanges, sealing plates, cages, screwed-in elements of the like.

In a pipe joint between a pipe of reinforced plastic material and a second pipe, this object is accomplished according to the invention in that the second pipe is provided with at least one peripheral shoulder, preferably continuous, adjacent to that end of said pipe which is to be connected, and the end of the pipe of reinforced plastic material overlaps said shoulder and is wound or molded or cast over the same.

Adhesives for improving the bond between a reinforced plastic material and metals or other plastic materials are known, and the adhesive layer which is preferably provided between the two pipe ends may consist, e.g., of an epoxy resin.

It will be understood that in an arrangement in which two metal pipes, e.g., two steel pipes, are connected, the pipe joint according to the invention is doubled up and back-to-back and the two joints are preferably symmetric with respect to the transverse central plane extending through the joint which is of reinforced plastic material.

The pipe of reinforced plastic material may be described as a connector in this case because it forms a pipe joint at each of its ends, and consists of electrically insulating material. If it is used to connect two metal pipes, this arrangement constitutes an electrically insulating pipe coupling.

Electrically insulated pipe couplings are known, e.g., from Austrian Patent Specification 302,748, where it is stated that such pipe couplings to be incorporated in a pipeline are usually made in that two connecting pipes of metal are connected by the pipe joints to the connector consisting of the electrically insulating material and the outer ends of these connecting pipes are then welded on the site into the pipeline.

Certain embodiments of the invention enable a further improvement of the pipe joint or of the insulating coupling which comprises two of such pipe joints and which permits of a mass production of pipe couplings, which distinguish by exhibiting no or only a small longitudinal expansion while having a very high compressive strength.

According to the invention this object is essentially accomplished in that each of the metal pipe end portions is increased in thickness to the wall of the metal pipe and is provided with a stairlike succession of collars and radial grooves, which have a shoulder, which is overlapped or wound over the ends of the pipe of reinforced plastic material.

Whereas the pipe joint according to the invention can be made in any known manner on a winding machine, a special mode of operation has proved to be particularly time-saving and enables the manufacture of electrically insulating pipe couplings of particularly high strength for pipelines which are large in diameter, e.g., 1000–2400 millimeters, without rejects.

The manufacturing process according to the invention resides essentially in that the pipe of plastic material is made as a cross-wound pipe having helix angles below 90° and adjacent to the radial grooves is provided with additionally wound layers having a helix angle of about 90°.

The winding geometry maintained in each step can be combined in known manner in an automatically controlled winding program. In this manner, couplings of high strength can be made automatically while all other parameters which could influence the winding operation carried out by the machine are kept constant. The resulting couplings can expand only in a radial direction and cannot expand longitudinally so that when they are incorporated in a pipeline they can equalize at least in part the expansion and contraction thereof in response to changes in temperature.

In making the pipe of plastic material, each layer thereof which extends in two grooves which are equally spaced from the inside surface of the metal pipe ends is cross-wound and the two grooves belonging to the laminate shell are only subsequently filled completely by a wound layer having a helix angle of approximately 90°. Whereas, e.g., when making cross-wound layers, the machine may be reversed after each forward-rearward winding cycle so that one of the two grooves is slightly filled, the procedure described hereinbefore gives better results in a shorter time.

It has also been found that a very strong pipe coupling which, for instance, in a diameter of 2000 millimeters, resists an internal pressure of 100 kilograms per square centimeter with a factor of safety of 6, can be made if a pipe of plastic material is wound in three layers and the inner and outer layers are wound at a smaller helix angle than the intermediate layer.

In each laminate shell, the several layers formed by respective forward-rearward winding cycles may have specific structures.

The strength will be improved if the helices formed by forward and rearward winding in each wound layer have helix angles of plus 60° and minus 60°, respectively, and the layer is completed by a forwardly wound, radial sublayer having a helix angle of about 0.6°.

Alternatively, the overlapping wound layers may consist only of cross-wound layers compressing forwardly wound sublayers having a helix angle of about plus 86° in alternation with rearwardly wound sublayers having a helix angle of about minus 4°.

If the pipe ends are properly designed, the pipe of plastic material can be made in such a manner that at least one predetermined sublayer of a wound layer consists of a zig-zag longitudinal helix between annular series of teeth on the pipe ends, and a radially wound sublayer wound over said zig-zag-wound sublayer. This will be described more fully hereinafter.

The pipe joint according to the invention may be provided in numerous embodiments which are designed with a view to the purpose for which the pipeline is intended. The advantages mentioned hereinbefore are common to all embodiments.

BRIEF DESCRIPTION OF THE DRAWINGS

FIG. 1 is a sectional view taken through the pipe wall at the joint showing the use of a second pipe having a collar;

FIG. 2 is similar to FIG. 1 but showing a variant form with the second pipe having an annular groove;

FIG. 3 is similar to FIG. 1 but showing a variant in which a second pipe has a wall reduced in thickness;

FIGS. 4, 5 and 6 are further variants showing a second pipe having a socket;

FIG. 7 is a view, partly in section, showing the pipe joint, specifically an electrically insulating pipe coupling consisting of two pipe joints having mirror symmetry, taken along line I in FIG. 8;

FIG. 8 is a top plan view, taken generally along line II—II of FIG. 7, showing the ends of one of the metal pipes which are connected by the coupling, without the wound layers, packing, and sealing ring; and FIG. 9 is a longitudinal section, partly cut away, showing another form consisting of a reducer for connecting conduit pipes of different diameters.

DESCRIPTION OF THE PREFERRED EMBODIMENT

In one pipe joint shown in FIG. 1, the end of a metal (or second) pipe 2a has a collar 3a provided with a shoulder 12a, and the end of a plastic (or first) pipe 1a consisting of reinforced plastic material is formed on the end of the second pipe 2a by being wound thereon. The hatched areas indicate that the first pipe 1a consists of a plurality of wound layers. Alternatively, the joint and the pipe 1a could be made by any other method, i.e., in that the first pipe 1a is molded or cast around the second pipe 2a. The collar 3a may have any desired profile. For instance, as is shown, it may have a step 10a on its side face which confronts the edge of the pipe. The collar 3a may radially or helically surround the pipe end. If the pipe is made by a winding process, rovings of the reinforcing fibers are first pulled through a bath of resin and are then wound in a predetermined pattern around a mandrel to form the wall of the pipe of reinforced plastic material. To make the pipe joint, the mandrel is replaced by the second pipe 2a and the winding process is carried out so that the shoulder 12a of the collar 3a is completely covered by the pipe end of the pipe of plastic material. It is also possible to use preimpregnated reinforcing fibers and to omit the resin bath.

In the manufacture of the pipe, the convolutions can be wound in any known manner, e.g., in a peripheral direction and/or helically, using linear or nonlinear winding programs.

FIG. 2 illustrates an embodiment in which the end of the second pipe 2b has a radial or helical groove 5b which is defined by a shoulder 12b and filled by the pipe 1b of reinforced plastic material.

The groove 5b may have any desired profile. For instance, as shown, it may have an approximately rectangular cross section and bevelled edges. Alternatively it may consist of a circular or oval section channel or may have an irregularly defined cross section and may radially or helically surround the second pipe end.

According to FIG. 3, the end of the second pipe 2c may have a wall portion 6c which is reduced in thickness and may also be provided with shoulders 12c at grooves 5c and on collars 3c or screw threads.

FIG. 4 shows how the pipe joint according to the invention may be used to make a reducer. The second pipe 2d is enlarged to form a socket 4d. The end of the second pipe 2d is reduced in thickness adjacent to the socket 4d and this portion of reduced thickness 6d is adjoined by a collar 3d having a shoulder 12d. The manufacture thus results in a first anchoring of the end of the pipe of reinforced plastic material on the end of second pipe 2d.

Similarly, a reducer may be made in that in a manner not shown the spigot end of a pipe having a socket is covered by the end of the pipe of plastic material.

It is known to provide pipes and pipe joints with a protective liner, which during the manufacture of the pipe is applied to the mandrel before the pipe is wound on the mandrel or the latter is covered in another manner with the reinforced plastic material.

In the embodiment shown in FIG. 5, the end of the second pipe 2e is enlarged to form a socket 4e and is covered by the pipe 1e of reinforced plastic material, which fills a groove 5e that is formed in the pipe 2e and defined by a shoulder 12e, and the pipe 2 is tightly contacted by the reinforced plastic material in the groove. The inside surface of the first pipe 1e of plastic material is provided with a protective liner 7e, which covers the line of contact between the two pipes on the inside surface thereof in a completely liquid- and gas-tight manner.

An embodiment as shown in FIG. 6 has proved desirable for an electrically insulated pipe coupling between pipes which have a large nominal width and are incorporated in a high pressure conduit which is, e.g., under an operating pressure of 120 kilograms per square centimeter above atmospheric pressure. The second pipe 2f is provided with a tubular connecting portion, which is enlarged to form a socket 4f, which has an axially inner portion of reduced wall thickness 6f and is provided at its end with a collar 3f having a shoulder 12f. The tubular connecting portion is filled with a packing 21f–26f as far as to the inside diameter of the second pipe 2f. The collar 3f is slightly undercut to form the shoulder 12f. The outside surface of the socket 4f as far as to the collar 3f and the adjoining surface of the packing are covered with a layer of reinforced plastic material which constitutes the pipe 1f.

The packing used in the pipe coupling may be designed in various ways and may consist of 21f–26f layers, at least one of which consists of electrically highly insulating material, such as particulate mica with polyester fibers and epoxy resin. In a high pressure-resisting pipe coupling for a pipeline having a large nominal width it may be of advantage for the innermost layer of the packing to consist, as shown, of a prefabricated connector layer 21f which consists of reinforced plastic material and is provided with a reinforcing sleeve layer 23f of steel and a protective layer 22f.

To manufacture the electrically insulating pipe coupling, this connector layer 21f is first pressed into and-/or adhered to the socket 4f of the second pipe 2f. This prefabricated part is fitted on a mandrel. The annular space around connector 21f and next to collar 3f is now filled with successive layers consisting of crackstopping layers 24f, insulation-reinforcing layers 25f, and layers of reinforced plastic material 26f. Finally, the reinforced plastic material 1f is applied in one operation over the socket 4f and the entire pack of inserts.

The resulting electrically insulating pipe coupling formed as a unit is stored and is welded at 27f onto a pipeline 28f when this is required.

According to FIGS. 7 and 8, the two ends of the metal pipes 2 to be connected are of increased thickness and have profiles having mirror symmetry. Each pipe end has two collars 3 and three radial grooves 5, each of which has preferably a trapezoidal cross section. In a production in series the work will be facilitated if the several radial grooves 5 have the same cross section.

The work will further be facilitated if the outside surface of the radial groove is directly continued by an inside surface of a collar 3, which has also preferably a trapezoidal cross section.

Alternatively, the grooves 5 and collars 3 formed with shoulders may have any other cross-sectional shape.

Each collar 3 has preferably radial incisions 15 so that in a pipe joint under triaxial stress the transmission of force from the metal part by means of a pipe of reinforced plastic material is improved. The collars 3 may have radial projections 19, such as pins or teeth, as well as recesses 20, such as peripheral grooves, helical grooves, crossing helical grooves, longitudinal grooves, or radial and longitudinal grooves with perforated lands. This may result in an additional anchoring of the several laminate shells of the plastic pipe material as the same is wound. The provision of pins or teeth is known in the art.

In the specific embodiments shown on the drawing, the plastic pipe material 1 is desirably made in a specific manner which will be described hereinafter, and the space between the inside surface of the plastic pipe material 1 and the adjacent edge faces of the metal pipe ends is filled with a packing which consists of at least one crack-stopping layer 8 and a prefabricated connection 10, which is covered by a protection layer or liner 18. The connection 10 may be prefabricated from any suitable material and consists preferably of fiber-reinforced plastic material. The crack-stopping layer 8 consists of wound helices, membranes, nonwoven webs, mats, woven fabric, and resin layers.

The adjacent end faces of the metal pipe ends may each have a groove 16, which contains a sealing ring 11 bearing on the protective layer or liner 18 of the connection 10.

The plastic pipe material 1 may be surrounded on its outside at each end in part by a protective sleeve 9, which specifically covers all radial grooves. A protective layer 14 of a soft elastic, electrically insulating, poured-in sealing compound may be provided between the protective sleeves so as to be flush with the outside surface thereof.

The entire pipe joint is finally completely covered by wound layers of insulating tape, not shown, and provided with an outer paint covering.

FIG. 9 is a longitudinal sectional view showing part of a pipe joint which comprises by way of example a reducer between pipes which differ in diameter. The pipe 2g which is larger in inside diameter is increased in thickness at the pipe end toward the axis of the pipe 2g. The pipe which is smaller in diameter is increased in thickness at the pipe end away from the axis of the pipe.

The reinforced plastic material may be made by any known winding process when the two metal pipe ends and the packing have been inserted in a holder, not shown, in the winding machine. The packing consists of the crack-stopping liner 8g and the prefabricated connector 10g, which is covered with a protective layer or liner 8g. As in the case of the species in FIG. 7, there may be protective sleeves 9g partially surrounding the outside of the plastic pipe material, as well as a protective layer 14g of a soft elastic, electrically insulating sealing compound generally flush with the outer surface.

It may be desirable first to provide an adhesive layer on the surface on which the pipe is to be wound and the adhesive may consist of the same resin or of a combination of a plurality of mutually compatible resins used to bond the reinforcing fibers of the plastic material pipe.

As has been mentioned hereinbefore, the reinforcing fibers which are impregnated with thermosetting plastic material and which have a resin-free volume amounting preferably to more than 60% of the volume of the plastic pipe material are preferably wound in such a manner that the pipe joint shown in the drawing is capable only of a peripheral expansion but cannot axially expand when the pipe joint is subjected to an internal pressure by the fluid flowing therethrough.

Radial, axial, and tangential stresses arise in the pipe body under pressure. To take up these forces, the fibers in the wound layers are wound with specific orientations. The specific winding geometry which is used results in a specific fiber structure in the plastic material pipe, preferably in the form of an isotensoid, so that the pipe can take up these stresses as tensile forces. In the optimum case, all fibers reach their ultimate stress at the same time.

In a particularly desirable embodiment the several layers are cross wound with different helix angles. In this case a particularly high burst strength in conjunction with a high bending strength can be obtained if in a plastic material tube comprising three wound laminate layers with the inner and outer laminate layers wound with a smaller helix angle than the intermediate laminate layer.

The taking up of radially outwardly acting pressure forces in the plastic material pipe may be further improved in that radially wound layers in a thickness of about 5–10% of the total built-up wall thickness of the plastic pipe material are applied directly to the crack-stopping layer 8 and are succeeded by a cross-wound layer to complete the innermost laminate shell as well as throughout the second laminate shell and finally in most of the uppermost laminate shell, whereas the outermost layers completing the uppermost laminate shell are formed by radially wound layers in a thickness of about 2–5%.

In addition to the preferred processes of making the pipe joint according to the invention comprising specific modes of winding the plastic pipe material, other winding modes comprising an incorporation of unidirectional rovings or woven fabrics of rovings may be adopted in view of the nominal width of the pipes, the fluid pressures, and the nature and coaction of all loads to which the pipe joint is to be subjected.

It will be understood that all individual features which have been described may be used in any desired combination. This results in numerous additional embodiments of the invention. Specifically, the invention comprises insulating pipe couplings, which are of the type mentioned hereinbefore and comprise pairs of pipe joints according to the invention.

In this specification the materials from which the pipes may be made which are connected according to the invention are stated only by way of example. It will be understood that they may be replaced by any other known or not yet known materials. For instance, the reinforcements may consist of boron fibers made in known manner by condensing boron vapor on extremely thin tungsten fibers. These boron fibers have an extremely high modulus of elasticity. To provide an optimum pipe coupling according to the invention for a specific use, a plastic material may be used which is reinforced with different reinforcing materials in suitable percentages.

Where the pipe joint according to the invention is to be used to couple pipes of plastic material, it is an advantage that known fittings may be used which consist of fiber-reinforced plastic material and can be made in a simple manner and distinguish from fittings made of other plastic material, e.g., of polyvinylchloride having the same strength, by extremely small wall thicknesses resulting in a light weight, whereas the fittings have a high dimensional accuracy and burst strength.

I claim:

1. In a pipe joint where end portions of two pipes are telescopically interfitted, one pipe being of reinforced plastic reinforced by plastic impregnated rovings including the end portion thereof interfitting with the second pipe, and the second pipe being of metal including the end portion interfitting with the pipe of reinforced plastic, the end of the metal pipe being telescoped into the end of the reinforced plastic pipe:

said end portion of the metal pipe having a peripheral shoulder thereon, and the plastic impregnated rovings at said end portion of said reinforced plastic pipe being wound tightly about said end portion of the metal pipe to complementally fit all surfaces of said shoulder.

* * * * *